United States Patent [19]
Alff

[11] Patent Number: 4,998,084
[45] Date of Patent: Mar. 5, 1991

[54] MULTIPOLAR MAGNETIC RING

[75] Inventor: Denis Alff, Cedex, France

[73] Assignee: The Torrington Company, Torrington, Conn.

[21] Appl. No.: 461,869

[22] Filed: Jan. 8, 1990

[30] Foreign Application Priority Data

Jan. 24, 1989 [FR] France .................................. 89 00781

[51] Int. Cl.$^5$ .............................................. H01F 7/02
[52] U.S. Cl. ...................................... 335/306; 310/168
[58] Field of Search ............... 335/284, 302, 303, 306; 310/168

[56] References Cited

U.S. PATENT DOCUMENTS

| 3,585,550 | 6/1971 | Weibenbrunn et al. | 335/284 X |
| 4,555,685 | 11/1985 | Maruyama et al. | 335/306 X |
| 4,835,505 | 5/1989 | Hattori et al. | 335/284 X |

Primary Examiner—George Harris
Attorney, Agent, or Firm—Michael H. Minns

[57] ABSTRACT

A multipolar magnetic ring is fomred by joining together two rings having the same geometry and magnetic characteristics. The coaxial rings have circumferentially spaced apart teeth which form identical magnetic poles. The magnetic poles of each ring are embedded into the spaces separating the magnetic poles of the other ring. The magnetic poles of each ring have the opposite polarity to the polarity of the adjacent poles of the other ring.

4 Claims, 1 Drawing Sheet

MULTIPOLAR MAGNETIC RING

The invention pertains to a multipolar magnetic ring constructed to be mounted on a rotating member for the purpose of generating an alternating magnetic signal. It is known that magnetic field sensors, such as those used in roller bearings have an encoder consisting of a multipolar magnetic ring which moves in front of a pulse counting sensor as the member rotates. This type of ring requires additional means of assembly and positioning.

Multipolar magnetic rings are known which have a magnetized ferromagnetic ring, the circumference of which consists of multiple segments with magnetic poles, each of which has a North pole and a South pole, located, respectively, between two poles of the opposite polarity. Such a ring requires the use of a ferromagnetic support and the application of a specific magnetizing procedure before assembly. The procedure is so difficult to use that the segments must be reduced in length if the magnetic material is to be saturated over the total thickness of the ring.

To obtain a high degree of precision in measuring of position or angular displacement, the ring must have a large number of poles. Moreover, when the encoder and the sensor are far apart, the encoder must generate a powerful magnetic field, either by the use of large quantities of magnetic material or by the use of specific materials such as rare earths, which offer high coercive fields but require a significant amount of magnetizing energy, which is incompatible with multipolar magnetization.

An object of the invention is a composite multipolar magnetic ring, the construction of which does not require any specific or complex magnetizing process, each part being subjected to bipolar magnetization before assembly.

Briefly described, the multipolar magnetic ring comprises a first ring having circumferentially spaced teeth. The teeth form identical magnetic poles. The multipolar magnetic ring has a coaxial second ring with circumferentially spaced teeth, with the teeth of the second ring forming identical magnetic poles. The magnetic poles of the first ring are located between the magnetic poles of the opposite polarity of the second ring.

The invention, as well as its many advantages, may be further understood by the reference to the following detailed description and drawings in which.

Figure 3:
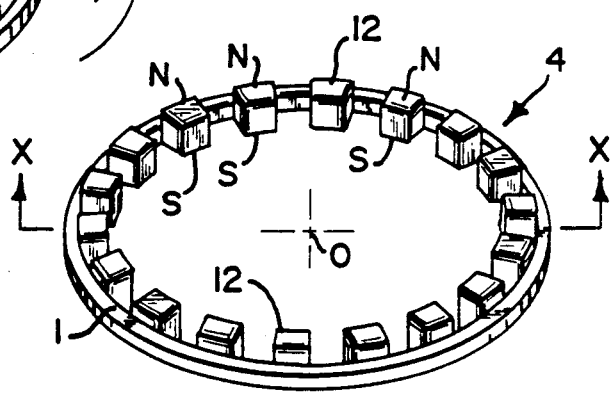
FIG. 3 is a perspective view of one of the rings.

Referring to the drawings and more particularly to FIG. 3, a bipolar ring 4 consists of an annular support 1, which holds teeth 2 pointing radially inward toward the center 0. Teeth 2 are equally spaced apart around the inside perimeter of the annular support, separated by spaces 3. Each tooth is magnetized to provide a North-South magnet.

By way of example, annular support 1 and teeth 2 can be produced simultaneously by a molding process, but teeth 2 can also be cast onto the support, whether or not the support is magnetic.

Figure 1:
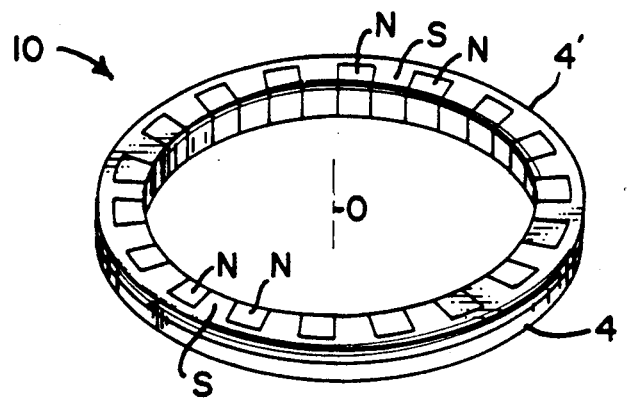
FIG. 1 is a preferred embodiment of the invention.
Figure 2:
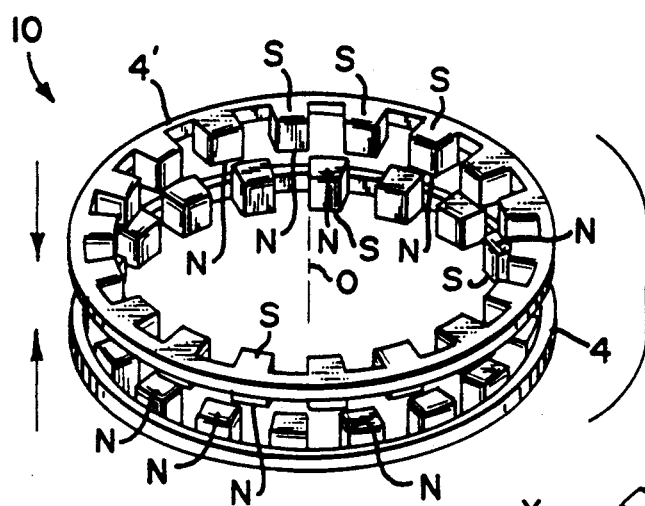
FIG. 2 shows the two rings in position ready for assembly.
Figure 4:
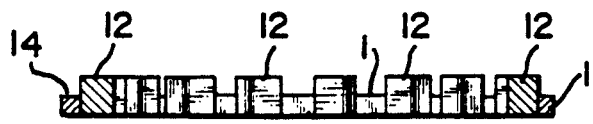
FIG. 4 is a view taken along line x—x of FIG. 3.

The multipolar magnetic ring 10 shown in FIG. 2 consists of two identical bipolar magnetic rings 4, 4,, each with the same geometry and magnetic characteristics. As shown in FIG. 3 and FIG. 4, the radially extending axial end surfaces 12 of the teeth 2 are axially spaced from the radially extending axial end surface 14 of annular support 1. As shown in FIG. 1 when assembled, the radially extending axial end surfaces of each ring extend along the same radial plane as the corresponding radially extending axial end surfaces of the other ring. The magnetic poles of each ring are embedded between the magnetic poles of the opposite polarity of the other ring.

Without going beyond the scope of the invention, it is possible for teeth like teeth 2 to face radially outwardly from the outside perimeter of annular support 1.

I claim:

1. A multipolar magnetic ring comprising:
   a first ring having a defined shape comprising an annular support, the annular support having an inner radial surface, an outer radial surface, a first surface and a second surface with a thickness between the first and second surfaces, the ring having circumferentially spaced teeth, the teeth extending axially and radially from the annular support, the axial length of the teeth being twice the thickness of the annular support, the teeth having identical magnetic polarity; and
   a coaxial second ring having the same shape as the first ring, the second ring being aligned with the first ring whereby the magnetic poles of the first ring are located between magnetic poles of the opposite polarity of the second ring.

2. The multipolar magnetic ring of claim 1, wherein the teeth have a first surface coextensive with the first surface of the annular support and a second surface, the magnetic polarity of the first surface of the teeth of the first ring being the same as the magnetic polarity of the first surface of the teeth of the second ring; and
   the second surface of the teeth having the opposite polarity of the first surface of the teeth.

3. The multipolar magnetic ring of claim 1 wherein the annular support contains ferromagnetic material.

4. The multipolar magnetic ring of claim 1 wherein the annular support is formed of non-magnetic material.

* * * * *